United States Patent [19]

Berkey

[11] Patent Number: 4,773,924
[45] Date of Patent: Sep. 27, 1988

[54] FIBER OPTIC COUPLER AND METHOD

[75] Inventor: George E. Berkey, Pine City, N.Y.

[73] Assignee: Corning Glass Works, Corning, N.Y.

[21] Appl. No.: 765,655

[22] Filed: Aug. 15, 1985

[51] Int. Cl.[4] .................. C03C 25/02; C03B 37/027
[52] U.S. Cl. ................................. 65/3.11; 65/4.2;
65/4.21; 350/96.15
[58] Field of Search .................. 65/4.21, 4.2, 3.11,
65/3.2, 3.15, 31; 350/96.15, 96.17, 96.21;
156/637, 657, 663

[56] References Cited

U.S. PATENT DOCUMENTS

| 2,608,722 | 9/1952 | Stuetzer | 65/4.21 |
| 3,253,896 | 5/1966 | Woodcock | 65/4.2 |
| 4,011,007 | 3/1977 | Phaneuf | 65/4.2 |
| 4,229,197 | 10/1980 | Streng | 65/4.2 |

FOREIGN PATENT DOCUMENTS 60-140208 7/1985 Japan.
8404822 12/1984 PCT Int'l Appl.

Primary Examiner—Kenneth M. Schor
Attorney, Agent, or Firm—William J. Simmons, Jr.

[57] ABSTRACT

A low loss fiber optic coupler is fabricated by forming a coupler preform having a plurality of spaced glass cores extending longitudinally through a matrix of glass having a refractive index lower than that of the cores. The coupler preform is formed by inserting a plurality of coated optical fiber preform rods into an aperture extending axially through an elongated boule of relatively etchable matrix glass. The cladding portion of the rods, which is relatively etch-resistant, is coated with a layer of etchable glass. The coupler preform is heated and stretched to form a glass rod which is then severed into a plurality of units. Heat is applied to the central region of each unit, and the central region is elongated and tapered inwardly. When an end of the unit is immersed in acid, the matrix glass dissolves, thereby leaving the unit cores and surrounding etch-resistant cladding glass protruding from the newly formed endface of the unit.

6 Claims, 3 Drawing Sheets

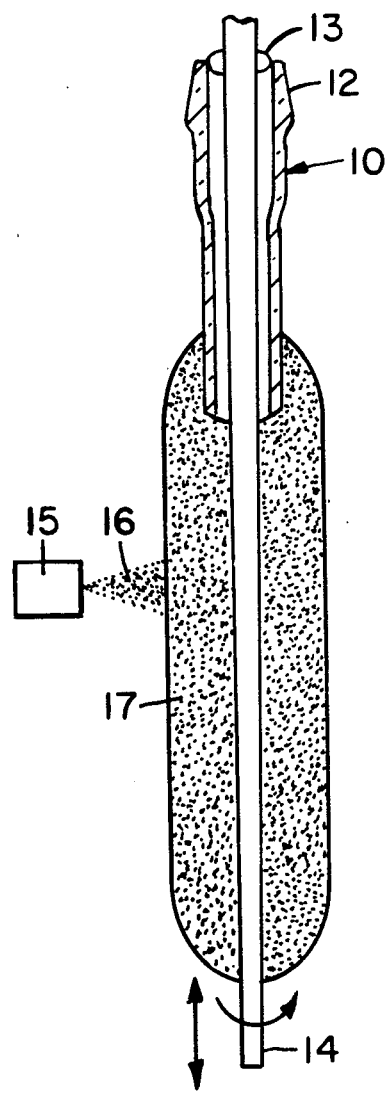
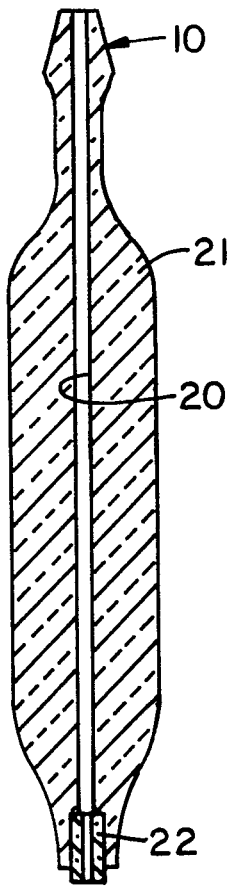
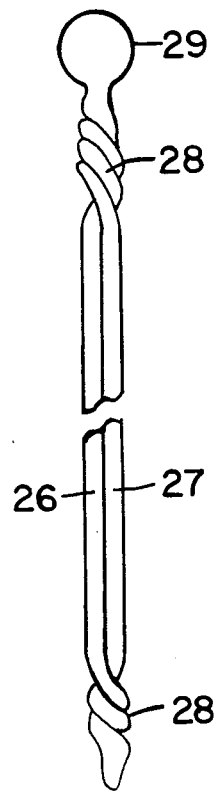
Fig. 1
Fig. 2
Fig. 3
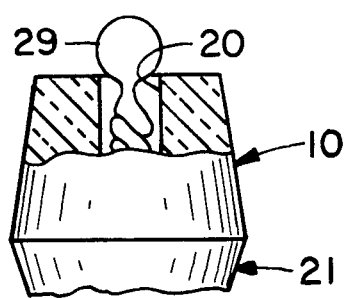
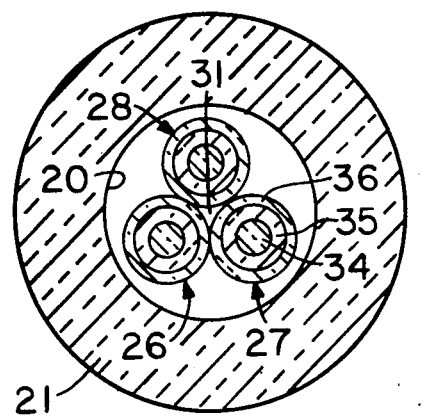
Fig. 4
Fig. 5

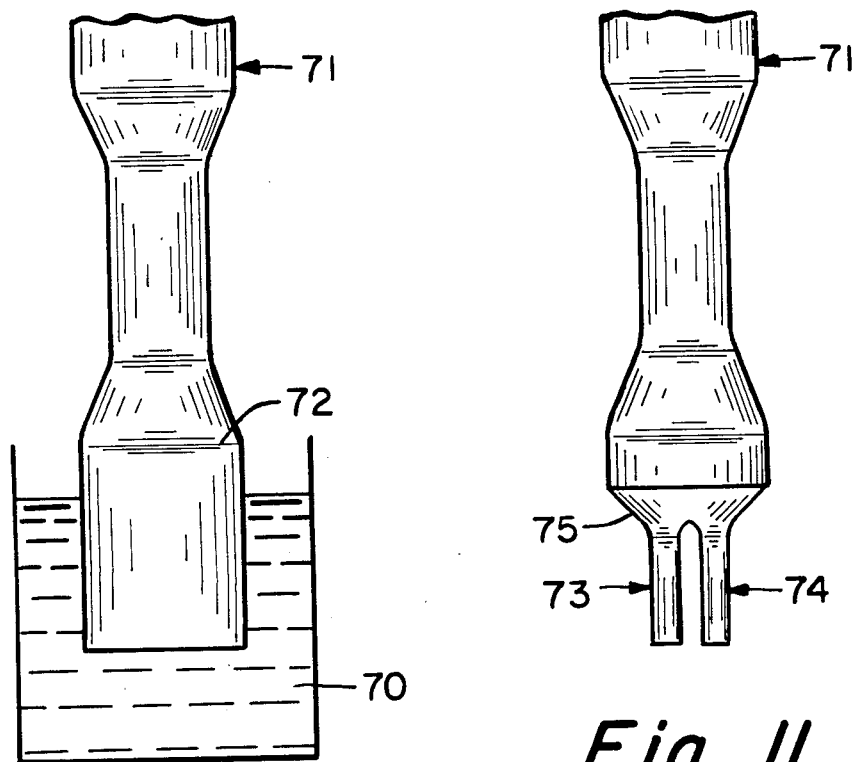
Fig. 10
Fig. 11
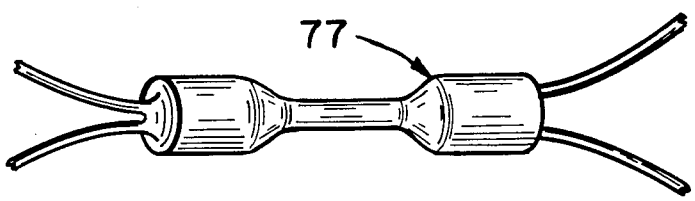
Fig. 12
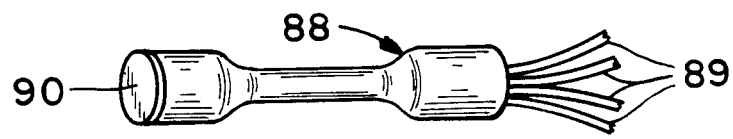
Fig. 13

FIBER OPTIC COUPLER AND METHOD

CROSS-REFERENCE TO RELATED APPLICATION

This application is related to U.S. patent application Ser. No. 765,652 entitled "Method of Making Low Loss Fiber Optic Coupler" (D. B. Keck et al.) and Ser. No. 765,654 entitled "Optical Fiber-Device Interconnection and Method" (C. W. Deneka et al.), both filed on even date herewith.

BACKGROUND OF THE INVENTION

The present invention relates to fiber optic couplers and more particularly to a low-cost method of making fiber optic couplers.

Certain types of fiber optic systems require couplers in which at least a portion of the light propagating in one fiber is coupled to one or more other fibers.

It has been known that coupling occurs between two closely spaced cores in a multiple core device. The coupling efficiency increases with decreasing core separation and, in the case of single-mode cores, with decreasing core diameter. There have been developed a number of couplers that are based on these principles.

Multimode and single-mode couplers have been formed by positioning a plurality of fibers side-by-side along a suitable length thereof and fusing the claddings together to secure the fibers and reduce the spacings between the cores. Coupling can be enhanced by stretching and rotating the fibers along the fused length thereof as taught in U.S. Pat. No. 4,426,215. Also, a portion of the cladding is sometimes removed by etching or grinding to decrease the intercore distance as taught in U.S. Pat. No. 4,449,781. These processes are labor intensive and do not always result in the formation of couplers exhibiting predetermined coupling characteristics. This latter mentioned disadvantage is particularly apparent in the manufacture of certain single-mode couplers wherein the coupling core sections are to remain linear.

Whereas most couplers are made by applying heat directly to the fibers to be joined, U.S. Pat. No. 3,579,316 teaches a method wherein the fibers are first inserted into a capillary tube where the ends may overlap. The capillary tube is formed of a glass having a refractive index lower than that of the fiber cladding material. Heat is applied to the capillary tube in the vicinity of fiber overlap and the tube is stretched until the diameter thereof approximates that of the original fibers. The original cores of the pulled-out part become vanishingly small, their stretched diameters being only about 1/100 the original diameters. The cladding of the original fiber becomes the core of the coupling section.

The disadvantages of the method of U.S. Pat. No. 3,579,316 are as follows. The method is costly since fibers must be inserted into a capilliary tube for each coupler. Also, the reduction in core diameter to 1/100 of the original diameter results in a lossy coupler, since the original cladding takes the place of the vanished cores. In the region of the coupler where the fiber cores taper from their "vanishingly small" size to their full size, an insufficient amount of the power can transfer from the cladding back to the core. Furthermore, it is difficult to maintain the cores straight and parallel to one another when fibers are inserted into a tube which is then stretched. Such nonlinear coupler cores can lead to decreased coupling efficiency in single-mode couplers.

Control of the excess device loss is a problem with such prior art devices. Variability of mode power in the split waveguides exists due to fabrication technique variations. In some devices, bifurcation of the input and output fiber ports is difficult to accomplish. Also many of the prior art fabrication steps are highly labor intensive and are therefore a major cost source.

Copending U.S. patent application Ser. No. 765,652 teaches an inexpensive method of making low loss couplers. In accordance with that method there is initially provided a coupler preform having a plurality of spaced glass cores extending through a matrix of glass having a refractive index lower than that of the glass cores. The coupler preform having a plurality of spaced glass cores extending through a matrix of glass having a refractive index lower than that of the glass cores. The coupler preform is heated and stretched to form a glass rod which is severed into a plurality of units. Heat is applied to the central region of each unit while the ends are pulled to elongate and taper inwardly the heated central region thereof. In one embodiment thereof the coupler comprises a matrix of etchable glass. Each of the coupler cores is surrounded by a cladding of etch-resistant glass. The ends of the coupler unit are immersed in acid to dissolve the immersed region of matrix glass from each end of the unit to expose the ends of the unit cores and the surrounding layer of etch-resistant cladding glass.

In accordance with the method of said copending application a plurality of longitudinally-extending holes are drilled in an elongated boule of matrix glass. A rod of core glass surrounded by a layer of the etch-resistant cladding glass is placed in each hole. It is difficult to drill the longitudinally extending holes parallel to each other since the drill can skew off at an angle from its intended direction. Also, drilling produces a rough surface which, if not smoothed, tends to produce seeds during the stretching operation. Furthermore, as the holes are drilled closer together to minimize the amount of matrix glass therebetween and thereby improve coupling, cracking tends to occur between holes.

SUMMARY OF THE INVENTION

It is therefore an object of the present invention to provide a method that overcomes the disadvantages of the prior art. Another object is to provide a low cost method of producing couplers that exhibit low excess device loss. A further object is to provide an easily fabricated optical fiber coupler to which fibers are easily connected. Yet another object is to provide a method of making a coupler wherein the coupler cores are maintained parallel to one another.

The present invention pertains to a method of fabricating a low loss fiber optic coupler comprising the following steps. There is initially provided a boule of matrix glass having a longitudinally-extending hole therethrough. The matrix glass is relatively easily dissolved in a given solvent. There is also provided a plurality of coated optical fiber preform rods, each comprising a core of glass having a refractive index greater than that of the matrix glass, an optical cladding on the core and an outer coating of glass that is relatively easily dissolved in the solvent. The optical cladding is relatively resistant to being dissolved in the solvent. The optical fiber preform rods are inserted into the longitudinally-extending hole. The resultant coupler preform is heated and stretched to form a coupler rod. The coupler rod is severed into a plurality of units in which the cores are flush with the endfaces thereof. The central region of each of the units is heated, elongated and tapered inwardly, whereby the cores of the unit become more closely spaced and become smaller in diameter at the central region than they are at the ends of the unit. At least one end of the unit is immersed in a bath of the given solvent to dissolve the immersed region of matrix glass therefrom to expose the ends of the unit cores and surrounding layer of solvent-resistant cladding glass.

BRIEF DESCRIPTION OF THE DRAWINGS

FIG. 1 illustrates the application of a coating of glass soot to a mandrel.

FIG. 2 is a cross-sectional view of a consolidated boule.

FIG. 3 shows an assembly of coated optical fiber preform rods.

FIG. 4 is a partial cross-sectional view of the handle end of a coupler preform.

FIG. 5 is a cross-sectional view of a coupler preform taken perpendicular to the axis thereof.

FIG. 10 illustrates an etching technique for removing a portion of the matrix glass to expose the ends of the fibers therein.

FIG. 11 shows a coupler unit after the etching treatment of FIG. 10.

FIG. 12 is an oblique view of a coupler formed in accordance with the present invention.

FIG. 13 is an oblique view of a reflective coupler formed in accordance with the method of the invention.

DESCRIPTION OF THE PREFERRED EMBODIMENT

Figure 6:
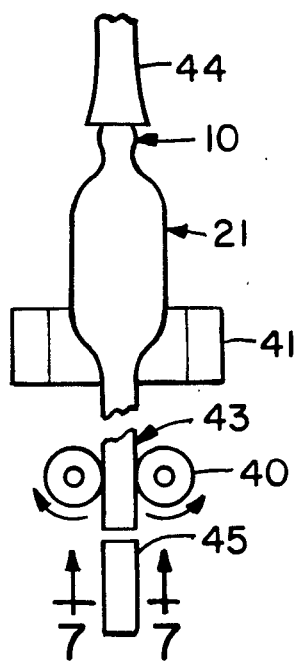
FIG. 6 is a schematic illustration of an apparatus for stretching a rod from a coupler preform.

It is to be noted that the drawings are illustrative and symbolic of the invention, and there is no intention to indicate scale or relative proportions of the elements shown therein.

In accordance with the method of the present invention there is initially provided an elongated boule having an axial bore therethrough. The boule, which consists of a glass that is relatively easily dissolved in a given solvent, may be formed by any suitable technique such as vapor deposition, melting or the like. If the boule is formed by melting or by some other technique that forms a solid glass body, a hole is drilled therethrough along the longitudinal axis. The rough surface caused by drilling should be smoothed prior to further processing.

A preferred method of forming the elongated boule is shown in FIG. 1. A handle 10 of the type disclosed in U.S. Pat. No. 4,289,522 may be employed. Handle 10 is a tubular member having a ground glass joint 12 at one end thereof. The large diameter end of a tapered mandrel 14 extends through handle 10 and is secured thereto by shims 13. The ends of the mandrel are mounted in a lathe where it is rotated and translated as indicated by the arrows. The mandrel may be initially coated with carbon soot to facilitate removal of the glass soot preform deposited thereon. A gas-vapor mixture is oxidized within the flame of burner 15 to form a glass soot stream 16 which is directed toward mandrel 14. One or more auxiliary burners (not shown) may be employed to direct a flame toward one or both ends of the soot preform during deposition to prevent breakage. While mandrel 14 is rotated and translated with respect to burner 15, a plurality of layers of soot are deposited thereon to form soot preform 17.

After deposition of particulate soot material to the extent required to form soot preform 17, mandrel 14 may be removed from the assembly by pulling it out through handle 10, thereby leaving a longitudinal aperture.

The ground glass joint portion of handle 10 is secured into a complimentary female ground glass joint member, whereby gas such as helium may be flowed through the handle, the preform aperture and the preform interstices just prior to and during the consolidation of the preform. Since the end of the soot preform aperture opposite the handle tends to close during consolidation, a short section of silica capillary tubing 22 is inserted therein. Since the silica tubing is more viscous than the preform glass, the tubing aperture remains open at consolidation temperature as shown in FIG. 2. The remainder of aperture 20 of boule 21 naturally remains open.

Gas phase etching can be employed to smooth the surface of aperture 20. This can be accomplished by flowing a fluorine-containing gas such as $C_2F_6$, $SF_6$ or the like through the aperture.

A plurality of optical fiber preforms are made by any suitable process such as outside vapor deposition (see for example U.S. Pat. Nos. 4,486,212 and 4,224,046). The fiber preforms comprise a glass core surrounded by a layer of cladding glass having a refractive index lower than that of the core. The cladding glass consists of a glass which is relatively resistant to dissolving in the given solvent. These optical fiber preforms possess core and cladding radii such that they could be drawn into single-mode or multimode optical fibers, whichever is desired in the resultant coupler. The optical fiber preforms are overclad or coated with a glass that is readily dissolved in the given solvent. The fiber preforms may be stretched prior to overcladding. The overcladding glass can be applied by a soot deposition technique such as that illustrated in FIG. 1, after which the composite article is consolidated and optionally stretched to reduce the diameter thereof. The elongated rod is severed into sections, each of which constitutes a coated fiber preform having a length about equal to that of boule 21. In FIG. 3, three such coated fiber preform rods 26, 27 and 28 are stacked together in side-by-side fashion, and both ends of the stack are heated, twisted and stretched to ensure that the rods are secured together. One end of the stack is heated to form a knob 29 having a diameter slightly larger than that of aperture 20 of boule 21.

The fused rods 26, 27 and 28 are inserted into the top of boule 21 of FIG. 2. Knob 29 suspends the rods from the top of boule 21 as shown in FIG. 4.

Coated fiber preforms 26, 27 and 28 are shown in greater detail in the enlarged cross-sectional view of FIG. 5. An aperture 31 exists between the preforms when more than two are employed. A slight gap may exist between rods 26, 27 and 28 and the wall of aperture 20 in order that the rods can be easily inserted therein. Each coated fiber preform rod comprises a core 34, a cladding 35 that is resistant to dissolving in the given solvent, and an outer coating 36 of glass that is readily dissolved in the solvent.

The stretching of the composite of FIGS. 4 and 5 into an elongated multicore coupling rod is schematically illustrated in FIG. 6. Preform 21 is drawn or stretched by tractors 40 in furnace 41 to form multicore coupler rod 43. Vacuum connection 44 is affixed to the ground glass joint on handle 10. Rod 43 is sliced into numerous units 45 of suitable length.

Figure 7:
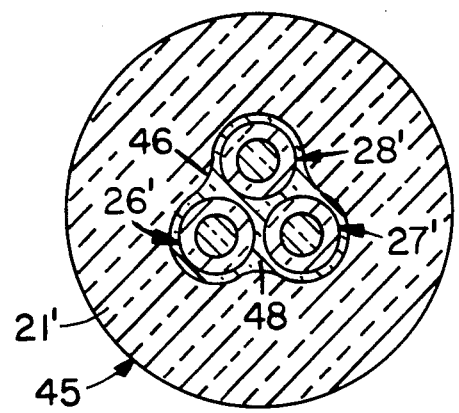
FIG. 7 is a cross-sectional view taken along lines 7—7 of FIG. 6.

Unit 45 is shown in cross-section in FIG. 7. The fiber preforms become elongated to form fibers 26', 27' and 28'. The glass from coatings 36 combines to form glassy region 48 that fills the open space 31 which had existed between the coated fiber preform rods. The adjacent region of matrix glass 21' is pulled inwardly by the vacuum against glassy region 48. If the glass of region 48 is softer than that which forms the claddings of fibers 26'-28', region 48 will tend to deform as the matrix glass 21' squeezes inwardly during stretching operation so that the shape of the harder glass fibers 26'-28' is not distorted. Matrix glass 21' and region 48 are both formed of glass which is easily dissolved in a given solvent. Region 48 and matrix glass 21' may be formed of the same glass composition, or region 48 may be formed of a glass having a refractive index greater than that of matrix glass 21'. The boundary between these two glasses is represented by line 46.

Figure 8:
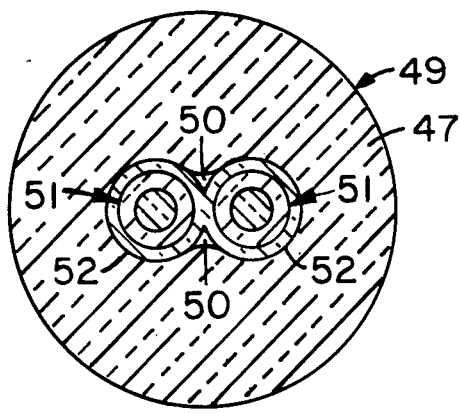
FIG. 8 is a cross-sectional view of a modified coupler unit.

As shown in FIG. 8 the combination of the boule of matrix glass and coated fiber preform rods can be drawn or stretched at a slightly lower temperature to form a unit 49 in which the interstices are not completely eliminated. For example, if high silica content glasses are employed, a draw temperature of about 1950° C. or higher will allow the interstices to be closed during the stretching operation. However, if the draw temperature is about 1850° C., the tension will be such that interstices 50 remain in unit 49. It is noted that in the stretching operation illustrated in FIG. 6, vacuum connection 44 is not employed when interstices 50 are to remain. It is obvious that the temperatures needed to form a rod with or without interstices depends upon the composition of the matrix glass and of the glass with which the optical fiber preform rods are coated. It is noted that the coupler of FIG. 8 comprises only two fibers 51. The glass-dissolving operation to be described below is facilitated by the presence of interstices 50.

Figure 9:
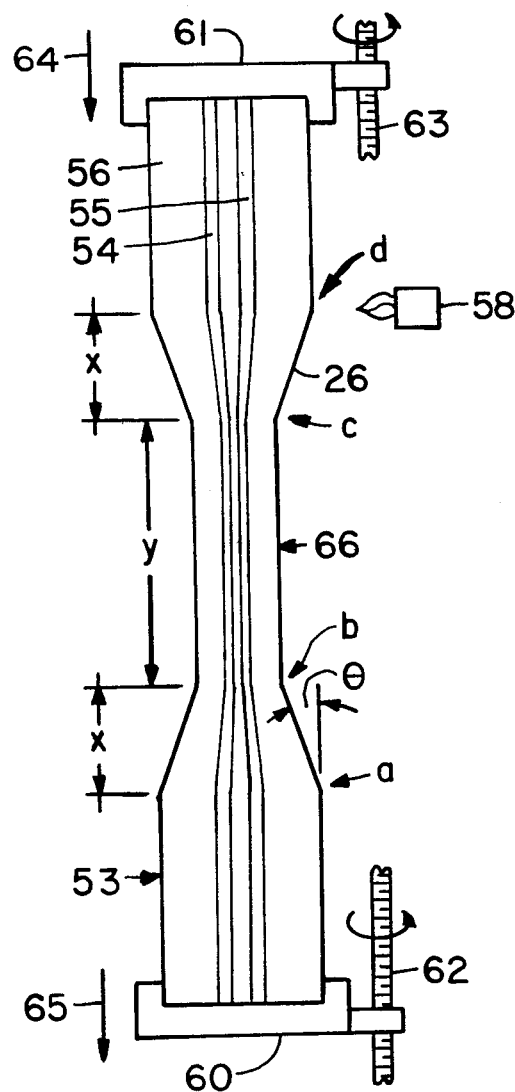
FIG. 9 schematically illustrates the heating and stretching of a severed unit to neck down the central region thereof.

The central region of unit 45 is subjected to a controlled thermal environment while it is stretched to form an elongated or necked-down region of reduced diameter. A preferred method for accomplishing this result is schematically illustrated in FIG. 9. For the sake of simplicity only two fibers are shown. Unit 53 is illustrated as comprising fibers 54 and 55 within matrix glass 56. Heat source 58, which must be localized at a narrow axial position, can be a burner, laser or the like, a ring burner being preferred. One end of unit 53 is inserted through the ring burner, which is represented by a single burner 58 in the drawings. The ends of unit 53 are then clamped to stages 60 and 61. The stages are vertically movable by rotating threaded shafts 62 and 63, respectively, which extend through threaded bores in those stages. Shafts 62 and 63 are connected to motors (not shown) the speed of which can be programmed to vary with respect to time.

Burner 58 is ignited and initially directs a ring of flame inwardly toward unit 53 at point a. Stage 61 begins to move downwardly (arrow 64) at a constant rate of 0.035 cm/sec, and stage 60 begins to move downwardly (arrow 65) at a rate of 0.075 cm/sec. The faster rate of movement of stage 60 causes unit 21 to become elongated as it moves downwardly through the stationary ring burner. The velocity of stage 60 increases in a linear manner from 0.075 cm/sec to 0.5 cm/sec as the relative position of burner 58 moves from point a to point b on unit 53. The velocity of stage 60 remains at 0.5 cm/sec until the relative position of burner 58 coincides with point c. Thereafter, the velocity of stage 60 decreases in a linear manner until it achieves a velocity of 0.05 cm/sec as the relative position of the burner reaches point d. At this time the flame is extinguished and both stages stop moving.

When a 3 mm diameter unit 53 was subjected to the above-described stretching process, the taper angle $\theta$ at both tapered regions was about 6°. The diameter of necked-down region 66 was 0.75 mm. The length x of each of the tapered regions was about 1 cm, and the length y of narrow, coupling region 66 was about 5 cm.

The device thus formed can function as an optical waveguide coupler since light propagating in one core will couple to the other cores in necked down region 66 where the cores are brought closer together and have reduced diameters. Away from necked down region 66, light does not couple from one core to the other since the cores are separated by a distance greater than the coupling distance.

If the unit being necked down contains interstices as illustrated in FIG. 8, those interstices are eliminated in the coupling zone during the neck down operation.

It is known that coupling can be further enhanced for certain types of couplers by rotating one end of unit 53 with respect to the other while it is being stretched. This could be accomplished by inserting one end of unit 53 in a rotatable chuck that is mounted on one of the stages 60 and 61. Such twisting of the coupling region causes the guided light to extend further into the cladding from the core in which propagation was initiated.

FIG. 10 shows the immersion of an end of a necked-down two fiber unit 71 in a bath 70 of suitable solvent such as acid. The acid etches or dissolves matrix material 72, thereby leaving the fiber ends 73 and 74 protruding from endface 75 as shown in FIG. 11. The length of unit 71 must be sufficient to provide the desired length of protruding fibers 73 and 74. Since the length of unit 71 that is immersed in acid is much greater than the radius thereof, the acid etches radially inwardly to dissolve cladding material from fibers 73 and 74 before those fibers have been appreciably shortened by etching.

The remaining end of unit 71 is then immersed in acid to expose the opposite ends of fibers 73 and 74 therein. A coupler 77 as shown in FIG. 12 is thus formed. The fibers protruding from the coupler can be fused to other fibers to fit into connector assemblies. The original diameter of the fiber preform rods of FIG. 3 and the size reduction that occurs in the stretching operation of FIG. 6 can be such that the fibers protruding from coupler 77 are the same diameter as the fibers that are to be connected thereto.

If the unit being etched contains interstices such as those illustrated in FIG. 8, the total etching time is reduced by the flow of acid through the interstices. Without such interstices, etching proceeds radially inwardly from the outer surface of the unit, the last area to be etched being that between the fibers. However, if the unit contains interstices 50 (FIG. 8), acid can flow through the interstices and more quickly dissolve the coating of etchable glass between the fibers.

FIG. 13 shows a reflective star coupler 88 produced in accordance with the method of the present invention. Optical fibers 89 protrude from one end thereof. The opposite endface is ground and polished to a surface that is substantially perpendicular to the longitudinal axis of the coupler. A reflective surface 90 such as a layer of silver is deposited on the polished endface.

The refractive index of the matrix material should be equal to or less than that of the fiber cladding. Referring to FIG. 5, fiber cladding 35 could consist of pure fused silica, whereas boule 21 and coatings 36 can consist of $SiO_2$ doped with a plurality of oxides which render the resultant glass more easily dissolved than silica, said plurality of oxides combining to provide a refractive index equal to or less than that of silica. Suitable combinations of oxides are $SiO_2$—$B_2O_3$—$GeO_2$ and $SiO_2$—$B_2O_3$—$TiO_2$. Both of these ternary glasses are more readily attacked by HF acid than silica.

In reference to the $SiO_2$—$B_2O_3$—$GeO_2$ system, the $B_2O_3$ lowers the refractive index while the $GeO_2$ increases it. The $B_2O_3$ decreases the durability of the glass whereas $GeO_2$ has very little effect on the durability of $SiO_2$. A suitable composition for matching the refractive index of $SiO_2$ is 11 wt. % $B_2O_3$, 6.1 wt. % $GeO_2$ and 82.9 wt. % $SiO_2$. It would be preferable to add even more $B_2O_3$ to further lower the durability of the glass, but the increase in the amount of $B_2O_3$ and $GeO_2$ also causes an increase in the expansion coefficient of the glass. As the expansion coefficient of the soluble glass increases with respect to that of silica, there is an increase in the probability that breakage will occur during various processing steps.

When $TiO_2$ is added to $SiO_2$, it raises the refractive index, but unlike $GeO_2$, $TiO_2$ in $SiO_2$ has a negative expansion coefficient. Thus, when $B_2O_3$ and $TiO_2$ are added to $SiO_2$, it is possible to add more $B_2O_3$ to the ternary composition since the $TiO_2$ offsets the positive expansion coefficient of the $B_2O_3$. A suitable composition might comprise about 18 wt. % $B_2O_3$, 3 wt. % $TiO_2$ and 79 wt. % $SiO_2$.

Coating 36 and boule 21 may consist of any material that is more soluble than the material of fibers 26, 27 and 28. One set of materials that could be utilized is described in U.S. Pat. No. 4,112,170. The BaO—$B_2O_3$—$SiO_2$ glasses described in that patent are more readily leachable in nitric acid than lead silicate glasses that are used therewith. Another approach would be to construct the etchable material from a photosensitive glass such as that sold under the trade name of "Photo-Ceram" by Corning Glass Works. This glass is processed by selectively exposing that portion thereof that is to be etched to ultraviolet light. This material is then heat treated at about 592° C. for about 30 minutes. The exposed glass is attacked at a much faster etching rate than the non-exposed glass by a suitable etchant such as a 12% solution of hydrofluoric acid in water.

Couplers have been made in which the thickness of the etchable glass between coupler fibers was about 10 μm. Some minimum thickness of etchable glass between fibers is desirable for the purpose of promoting flow of the etching solution between the fibers in order to separate them as fast as possible. However, it is noted that it is also desirable to maintain the fibers in a very close relationship to promote coupling.

It is noted that the light attenuation properties of the glasses from which a coupler is constructed are not as critical as are the properties of glasses from which long lengths of fibers are made since the coupling distance may be only about 60 mm and the thickness of glassy region 48 between fibers may be as small as 2 μm in the coupling region.

Whereas the etching of a single coupler unit has been described hereinabove, a plurality of units could be simultaneously etched in the same bath for more economic production.

It should be understood that the method of the present invention can be used to make single-mode or multimode couplers. The refractive index profiles of the cores within the coupler may be the same as the profiles of the fibers that are to be connected to the coupler. Most multimode fibers have an α-value of about 2.0 to optimize bandwidth. The α-values of the coupler cores might be between about 3 and 10 to enhance coupling and minimize splicing loss.

The following specific example illustrates the manner in which the method of the present invnetion can be employed to made an optical fiber coupler. While a mandrel was rotated and translated there was deposited thereon a soot preform having a composition 11 wt. % $B_2O_3$, 6.1 wt. % $GeO_2$ and 82.9 wt. % $SiO_2$. The mandrel was removed, and the preform was consolidated to form a boule having an axial aperture.

A single mode optical fiber preform was made by the soot deposition technique disclosed in U.S. Pat. No. 4,486,212. The core consisted of 10 wt. % $GeO_2$ and 90 wt. % $SiO_2$. The cladding consisted of pure $SiO_2$. The resultant blank, which had a diameter of 52 mm, was stretched into a rod having a diameter of 7 mm. A section of the rod was rotated and translated while there was applied thereto a coating of the same composition of boro-germania silicate soot that was used to form the boule. The resultant preform was consolidated and then transferred hot to a redraw furnace where it was stretched into a 1.5 mm diameter rod. This rod was severed into pieces of about 22 cm length. The rod was cut with a torch to prevent fracture due to the expansion mismatch between the coating and the remainder of the rod. Two rods were fused together at both ends, and a knob was formed at one end. The rods were inserted into the boule aperture, and were suspended by the knob. The resultant coupler preform was heated to about 1950° C. and stretched into a multicore coupler rod having a diameter of 3 mm. The rod was cut into units having a length of 15 cm. Each unit was inserted into an apparatus of the type described in conjunction with FIG. 9 and was stretched until it was 18 cm long. The diameter of the central region decreased to 0.7 mm. One end of each unit was submersed to a depth of 6 cm in 50% HF for approximately 2½ hours until it was observed that the matrix glass had been dissolved from the fibers. The etching step was then repeated at the opposite end of the unit. The resultant coupler was 18 cm long and had 6 cm long, 125 μm diameter fibers protruding from each end. It is estimated that the thickness of the etchable glass separating the fibers in the coupling region was about 2 μm.

I claim:

1. A method of fabricating a cylindrical glass preform comprising the steps of providing a boule of matrix glass having a longitudinally-extending aperture and having a predetermined maximum cross-sectional dimension where the cross-section is perpendicular to the longitudinal direction, providing a plurality of coated optical fiber preform rods, each comprising a core of glass different from said matrix glass, a glass cladding on said core, and an outer coating of glass on said glass cladding, inserting said plurality of optical fiber preform rods into said aperture, heating and stretching the resultant coupler preform to reduce the predetermined maximum cross-sectional dimension of said boule, reduce the diameters of said cores and glass claddings of said optical fiber preform rods, and reduce but not eliminate the spacing between the glass claddings of adjacent optical fiber preform rods, said heating and stretching being effected until a coupler rod is formed, severing said coupler rod into a plurality of units in which said cores are substantially parallel to one another, and applying heat to the central region of each of said units while elongating and tapering inwardly the heated central region thereof, whereby the cores of said unit are more closely spaced and are of smaller diameter at said central region than they are at the ends of said unit.

2. A method in accordance with claim 1 wherein said outer coating of glass is softer than said glass cladding so that during the step of heating and stretching, said matrix glass squeezes inwardly on said outer coating of glass, whereby said outer coating of glass is caused to deform and flow into interstices between said preform rods, the fibers formed by the cores and glass claddings of said optical fiber preform rods remaining substantially undistorted in cross-sectional shape.

3. A method in accordance with claim 2 wherein said matrix glass and said outer coating of glass have the same composition.

4. A method in accordance with claim 3 wherein the step of providing a boule comprises providing a boule of glass comprising $B_2O_3$, $TiO_2$ and $SiO_2$.

5. A method in accordance with claim 4 wherein said glass cladding comprises $SiO_2$.

6. A method in accordance with claim 1 wherein, prior to the step of inserting said plurality of rods, said rods are grouped together to form a bundle of fibers, and both ends of said bundle are secured together.

* * * * *